(12) United States Patent
Otaka (10) Patent No.: US 12,028,829 B2
(45) Date of Patent: Jul. 2, 2024

(54) INFORMATION PROCESSING DEVICE, MOBILE OBJECT, INFORMATION PROCESSING METHOD, AND COMPUTER READABLE STORAGE MEDIUM

(71) Applicant: HONDA MOTOR CO.,LTD., Tokyo (JP)

(72) Inventor: Masaru Otaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 212 days.

(21) Appl. No.: 17/679,138

(22) Filed: Feb. 24, 2022

(65) Prior Publication Data

US 2022/0322279 A1    Oct. 6, 2022

(30) Foreign Application Priority Data

Mar. 30, 2021    (JP) ................. 2021-058357

(51) Int. Cl.
*H04W 64/00* (2009.01)
*G07C 5/00* (2006.01)
*H04B 17/318* (2015.01)
*H04W 72/27* (2023.01)

(52) U.S. Cl.
CPC .......... *H04W 64/006* (2013.01); *G07C 5/008* (2013.01); *H04B 17/318* (2015.01); *H04W 72/27* (2023.01)

(58) Field of Classification Search
CPC ... H04W 64/006; H04W 72/27; H04W 36/36; H04W 84/12; H04W 36/32; H04W 48/20; H04W 4/44; H04W 36/0085; H04W 36/08; H04W 36/30; G07C 5/008; H04B 17/318
USPC ....................................... 455/456.1
See application file for complete search history.

(56) References Cited

U.S. PATENT DOCUMENTS

2013/0272269 A1   10/2013   Srivastava
2019/0124578 A1 *  4/2019   Nieh ............. H04W 36/30
2019/0380170 A1 * 12/2019   Bode ............ B61L 27/70

FOREIGN PATENT DOCUMENTS

JP      2015525010 A    8/2015

* cited by examiner

*Primary Examiner* — Huy C Ho (57) ABSTRACT

An information processing device provided in a mobile object, including: a processor for obtaining, while a communication unit connects to a first access point and executes wireless communication through the first access point, information representing a first communication quality being communication quality for wireless communication between the communication unit and the first access point, and information representing a second communication quality being communication quality for wireless communication between the communication unit and a second access point, switching, if a difference between the second communication quality and the first communication quality is greater than a predetermined quality reference value, a connection target of the communication unit from the first access point to the second access point, and preventing, such that the faster a moving speed of the mobile object is, the less often switching of the connection target occurs.

15 Claims, 9 Drawing Sheets

THRESHOLD INFORMATION 300  URBAN AREA

| SPEED | QUALITY THRESHOLD VALUE | TIME THRESHOLD VALUE |
|---|---|---|
| $v < v1$ | RSSI THRESHOLD VALUE 1 | TIME THRESHOLD VALUE 1 |
| $v1 \leq v < v2$ | RSSI THRESHOLD VALUE 2 | TIME THRESHOLD VALUE 2 |
| $v2 \leq v$ | RSSI THRESHOLD VALUE 3 | TIME THRESHOLD VALUE 3 |

THRESHOLD INFORMATION 300a  QUASI-CITY AREA

| SPEED | QUALITY THRESHOLD VALUE | TIME THRESHOLD VALUE |
|---|---|---|
| $v < v1$ | RSSI THRESHOLD VALUE 1a | TIME THRESHOLD VALUE 1a |
| $v1 \leq v < v2$ | RSSI THRESHOLD VALUE 2a | TIME THRESHOLD VALUE 2a |
| $v2 \leq v$ | RSSI THRESHOLD VALUE 3a | TIME THRESHOLD VALUE 3a |

THRESHOLD INFORMATION 300b  NON-URBAN AREA

| SPEED | QUALITY THRESHOLD VALUE | TIME THRESHOLD VALUE |
|---|---|---|
| $v < v1$ | RSSI THRESHOLD VALUE 1b | TIME THRESHOLD VALUE 1b |
| $v1 \leq v < v2$ | RSSI THRESHOLD VALUE 2b | TIME THRESHOLD VALUE 2b |
| $v2 \leq v$ | RSSI THRESHOLD VALUE 3b | TIME THRESHOLD VALUE 3b |

*FIG.3*

| LOCATION | TYPE |
|---|---|
| P1 | URBAN AREA |
| P2 | QUASI-CITY AREA |
| ⋮ | ⋮ |
| OTHER | NON-URBAN AREA |

FIG.4

| NUMBER OF ACCESS POINTS | FIRST THRESHOLD ADJUSTING FACTOR |
|---|---|
| $n < N1$ | FACTOR 1 |
| $N1 \leq n < N2$ | FACTOR 2 |
| $N2 \leq n$ | FACTOR 3 |

FIG.5

| CURRENT COMMUNICATION QUALITY | SECOND THRESHOLD ADJUSTING FACTOR |
|---|---|
| RSSI < RSSI_1 | FACTOR 1' |
| RSSI_1 ≦ RSSI < RSSI_2 | FACTOR 2' |
| RSSI_2 ≦ RSSI | FACTOR 3' |

FIG.6

| SSID | RSSI | CONNECTING FLAG | TIME |
|---|---|---|---|
| AP01 | RSSI1 | 1 | - |
| AP02 | RSSI2 | 0 | t1 |
| AP03 | RSSI3 | 0 | t2 |
| AP04 | RSSI4 | 0 | 0 |
| AP05 | RSSI5 | 0 | 0 |

INFORMATION PROCESSING DEVICE, MOBILE OBJECT, INFORMATION PROCESSING METHOD, AND COMPUTER READABLE STORAGE MEDIUM

The contents of the following Japanese patent application(s) are incorporated herein by reference:
NO. 2021-058357 filed on Mar. 30, 2021.

BACKGROUND

1. Technical Field

The present invention relates to an information processing device, a mobile object, an information processing method, and a computer readable storage medium.

2. Related Art

Patent Document 1 describes about wireless LAN communication in which one access point is disconnected and then another access point is connected.

Patent Document 1: Japanese Translation Publication of a PCT Route Patent Application No. 2015-525010

DESCRIPTION OF EXEMPLARY EMBODIMENTS

Hereinafter, the present invention will be described through embodiments of the invention, but the following embodiments do not limit the inventions that fall within the scope of the claims. Some combinations of features described in the embodiments may be unnecessary for solving means of the invention.

Figure 1:
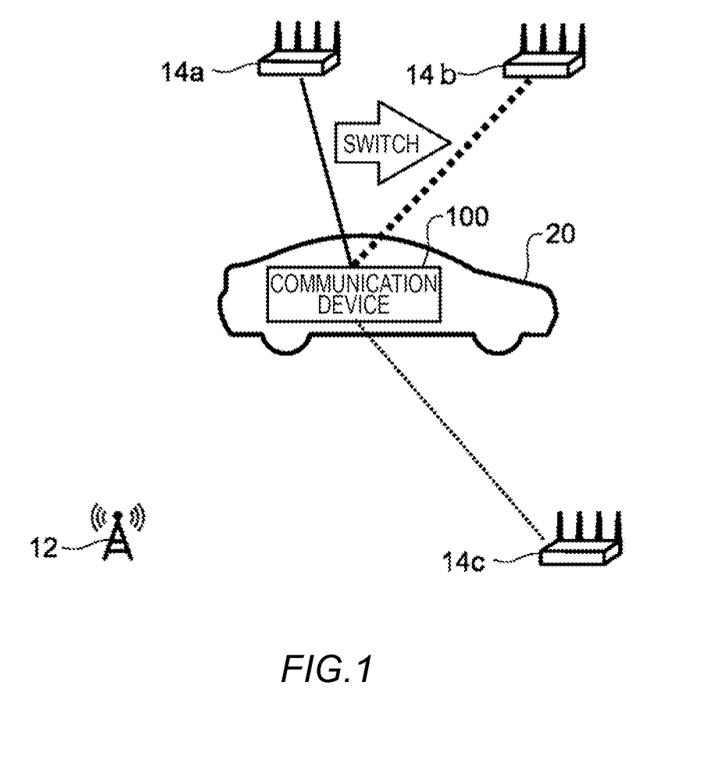
FIG. 1 schematically illustrates a vehicle 20 according to one embodiment, together with a wireless access point 14a, a wireless access point 14b, and a wireless access point 14c, and a base station 12.

FIG. 1 schematically illustrates a vehicle 20 according to one embodiment, together with a wireless access point 14a, a wireless access point 14b, and a wireless access point 14c, and a base station 12. In the present embodiment, the wireless access point 14a, the wireless access point 14b, and the wireless access point 14c may be collectively referred to as "a wireless access point 14".

The base station 12 belongs to a mobile communication network. The wireless access point 14 is a wireless LAN (local area network) access point, for example. The wireless access point 14 may be a public wireless LAN access point, for example. The wireless access point 14 may be a wireless access point placed in transportation infrastructure. The wireless access point 14 may be a wireless access point placed in a facility close to transportation infrastructure.

The vehicle 20 includes a communication device 100. The communication device 100 has functions for performing wireless LAN communication, and mobile communication through the base station 12. The communication device 100 has a function for switching the wireless access point 14 to be connected. Here, it is assumed that the communication device 100 is connected to the wireless access point 14a, and performing the wireless LAN communication through the wireless access point 14a. At this time, it is assumed that a RSSI (received signal strength indicator) is used as an indicator of communication quality between the communication device 100 and the wireless access point 14a. A RSSI1 is the received signal strength indicator from the wireless access point 14a. While the communication device 100 communicates with the wireless access point 14a, the communication device 100 searches for the wireless access point 14b and the wireless access point 14c in its surroundings, and also obtains a received signal strength indicator RSSI2 from the wireless access point 14b, and a received signal strength indicator RSSI3 from the wireless access point 14c.

If RSSI2−RSSI1 (may be referred to as a "relative RSSI") being a difference between RSSI2 and RSSI1 exceeds a predetermined quality threshold value while the communication device 100 performs the wireless LAN communication with the wireless access point 14a, the communication device 100 switches a connection target from the wireless access point 14a to the wireless access point 14b, and starts wireless LAN communication with the wireless access point 14b. The faster a speed of the vehicle 20 is, the more often the communication device 100 prevents the switching between the wireless access points 14. For example, the communication device 100 increases a quality threshold value to be used for determining the switching between wireless access points. As a result of this, the faster the speed of the vehicle 20 is, the less often the switching between the wireless access points 14 can occur.

Switching between the wireless access points 14 requires some time, and thereby there is some time until data communication actually starts. For example, until the data communication actually starts, sometime is required in order to communicate and perform association and authentication processes etc. with a wireless access point to be switched to. Therefore, even if the communication quality with the wireless access point 14 to which the communication is switched is good, frequently switching between the wireless access points 14 may rather cause communication throughput to be reduced. According to the control by the communication device 100, the faster the speed of the vehicle 20 is, the less often the switching between the wireless access points 14 can occur. Therefore, the communication throughput can be prevented from being reduced by frequently switching between the wireless access points 14. For example, the faster the speed of the vehicle 20 is, the greater the quality threshold value for determining the switching between the wireless access points 14 is set. Thereby, if the wireless access point 14 having an excellent RSSI is found, the connection target is switched to that wireless access point 14 so that fast communication can be performed, and thus an increase in total communication throughput can be expected. Such control is advantageous when controlling in an urban area having many wireless access points 14, for example.

Figure 2:
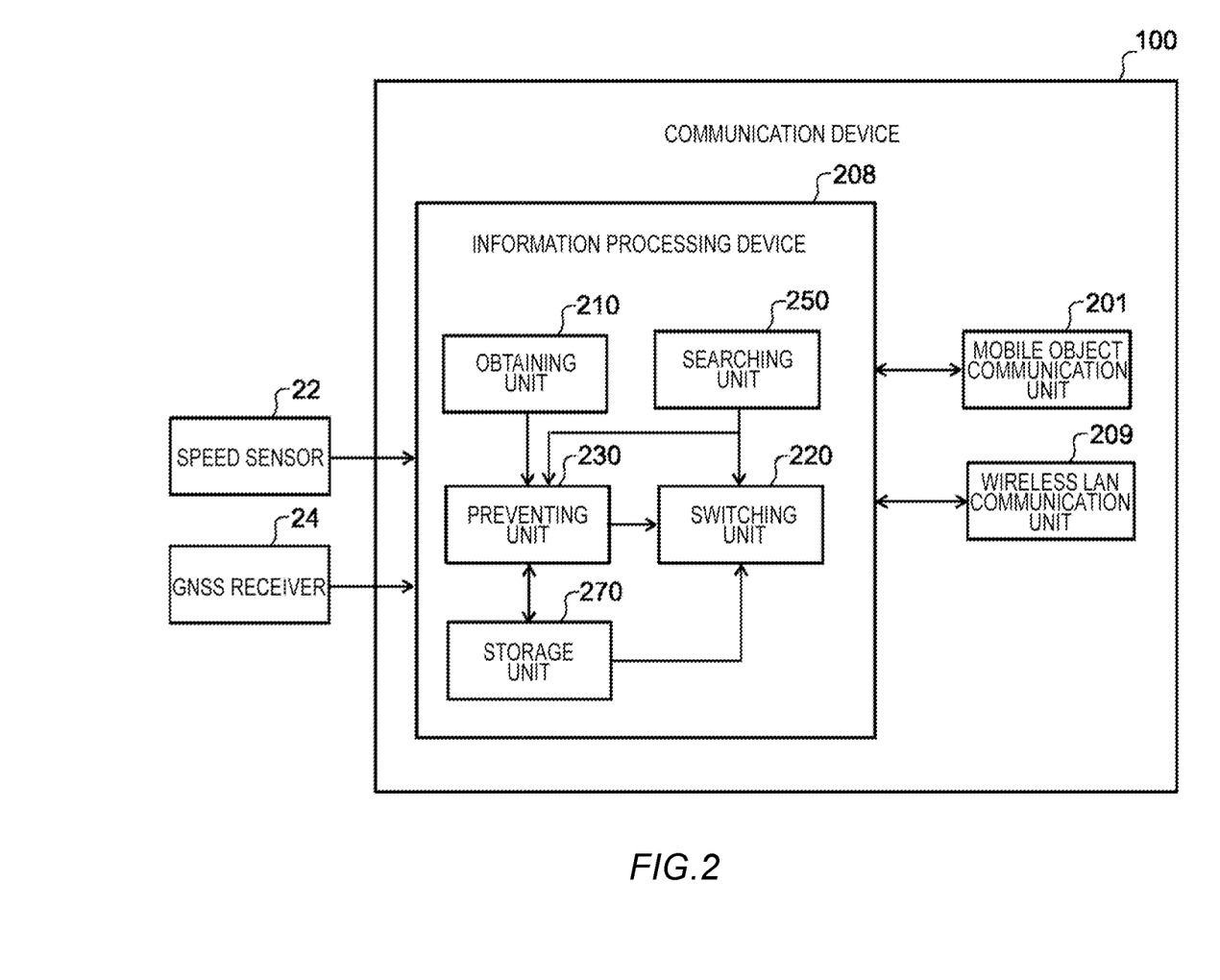
FIG. 2 schematically illustrates a system configuration of the vehicle 20.

FIG. 2 schematically illustrates a system configuration of the vehicle 20. The vehicle 20 includes the communication device 100, a speed sensor 22, and a GNSS receiver 24. The speed sensor 22 detects a speed of the vehicle 20. The GNSS receiver 24 receives radio waves from a GNSS satellite and creates location information. Note that, in order to clearly explain the control of the switching between the wireless access points 14 in the vehicle 20, the present embodiment shows an example of this configuration in which the vehicle 20 includes the communication device 100, the speed sensor 22, and the GNSS receiver 24. However, the configuration of the vehicle 20 is not limited to this example of the present embodiment.

The communication device 100 includes a mobile object communication unit 201, an information processing device 208, and a wireless LAN communication unit 209. The mobile object communication unit 201 mainly performs mobile communication. The wireless LAN communication unit 209 performs the wireless LAN communication. The wireless LAN communication unit 209 communicates according to IEE802.11 series, for example. The wireless LAN communication unit 209 is one example of a "communication unit". The mobile object communication unit 201 and the wireless LAN communication unit 209 may be implemented as one Telematics Control Unit.

The information processing device 208 includes an obtaining unit 210, a switching unit 220, a preventing unit 230, a storage unit 270, and a searching unit 250.

The obtaining unit 210 obtains, while the wireless LAN communication unit 209 connects to a first access point and executes wireless communication through the first access point, information representing a first communication quality being communication quality of the wireless communication between the wireless LAN communication unit 209 and the first access point, and information representing a second communication quality being communication quality of wireless communication between the wireless LAN communication unit 209 and a second access point. The switching unit 220 switches, if a difference between the second communication quality and the first communication quality is greater than a predetermined quality reference value, a connection target of the wireless LAN communication unit 209 from the first access point to the second access point. The faster the moving speed of the vehicle 20 is, the more often the preventing unit 230 prevents switching of a connection target.

The faster the moving speed of the vehicle 20 is, the greater the preventing unit 230 sets the quality reference value.

The preventing unit 230 sets the quality reference value based further on a current location of the vehicle 20. For example, the storage unit 270 associates information representing a geographical location with an index value for the number of access points being placed, and stores the associated information. The greater the index value which is associated with the geographical location that matches the current location of the vehicle 20 and stored in the storage unit 270 is, the greater the preventing unit 230 sets the quality reference value.

The searching unit 250 searches for access points being connectable by the wireless LAN communication unit 209. The more access points that has been searched by the searching unit 250 are, the greater the preventing unit 230 may set the quality reference value.

The lower the first communication quality is, the lower the preventing unit 230 may set the quality reference value.

The switching unit 220 switches, if the difference between the second communication quality and the first communication quality remains being greater than a predetermined quality threshold value for a period of time beyond a predetermined time threshold value, the connection target of the wireless LAN communication unit 209 from the first access point to the second access point. The faster the moving speed of the vehicle 20 is, the longer the preventing unit 230 sets the time threshold value.

The preventing unit 230 may set the time threshold value based further on a current location of the vehicle 20. For example, the storage unit 270 may associate information representing a geographical location with an index value representing the number of access points being connectable, and store the associated information. The greater the index value which is associated with the geographical location that matches the current location of the vehicle 20 and stored in the storage unit 270 is, the longer the preventing unit 230 may set the time threshold value.

Note that, the more the access points that has been searched by the searching unit 250 are, the longer the preventing unit 230 may set the time threshold value. The lower the first communication quality is, the shorter the preventing unit 230 may set the time threshold value.

Figure 3:
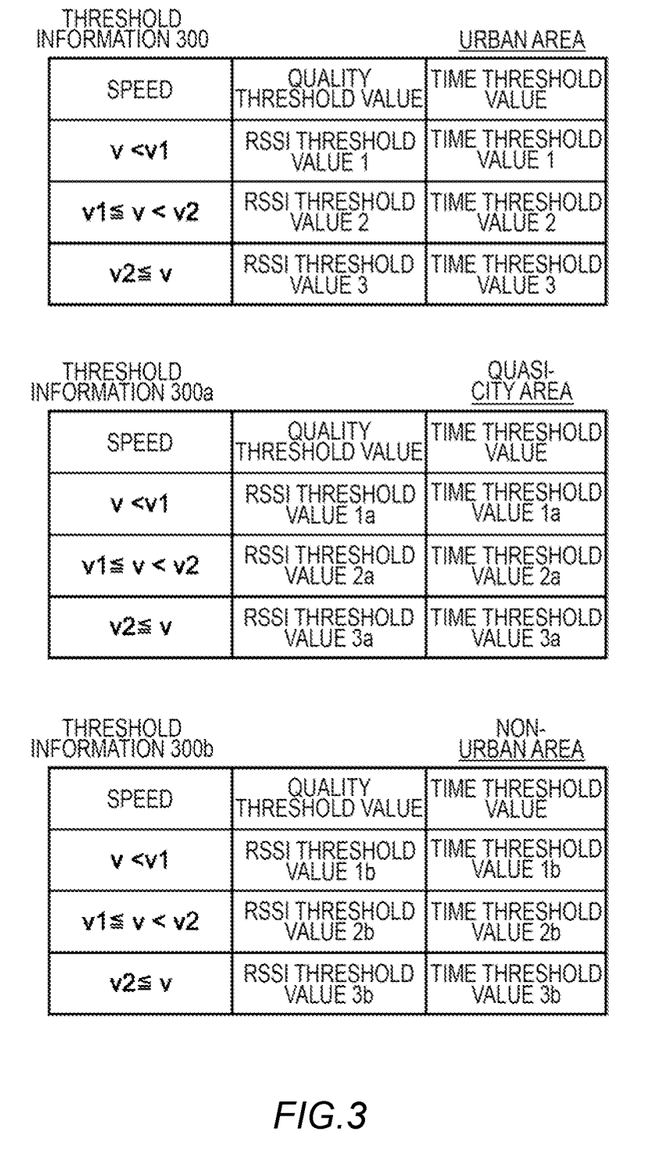
FIG. 3 illustrates one example of data structure for threshold information used by a preventing unit 230.

FIG. 3 illustrates one example of data structure for threshold information used by the preventing unit 230. The threshold information is for associating the speed, the quality threshold value, and the time threshold value with one another. The threshold information is stored in the storage unit 270. Threshold information 300 is threshold information for the urban area. Threshold information 300a is the threshold information for a quasi-city area. Threshold information 300b is the threshold information for a non-urban area. The "urban area", "quasi-city area", and "non-urban area" are information representing a type of the geographical location.

The "speed" shows a range related to a speed v of the vehicle 20. Here, v1<v2.

The "quality threshold value" is a threshold value related to the relative RSSI to be used for determining the switching between the wireless access points 14. In the threshold information 300, a RSSI threshold value 1<a RSSI threshold value 2<a RSSI threshold value 3. In the threshold information 300a, a RSSI threshold value 1a <a RSSI threshold value 2a<a RSSI threshold value 3a. In the threshold information 300b, a RSSI threshold value 1b<a RSSI threshold value 2b<a RSSI threshold value 3b.

The "time threshold value" is a threshold value related to "a period of time in which a relative threshold value has exceeded the quality threshold value" to be used for determining the switching between the wireless access points 14. In the threshold information 300, a time threshold value 1<a time threshold value 2<a time threshold value 3. In the threshold information 300a, a time threshold value 1a<a time threshold value 2a<a time threshold value 3a. In the threshold information 300b, a time threshold value 1b<a time threshold value 2b<a time threshold value 3b.

The preventing unit 230 sets, if the vehicle 20 is in the urban area, the quality threshold value and the time threshold value corresponding to the vehicle 20 by using the threshold information 300 corresponding to the urban area. Here, assuming that a current speed v of the vehicle 20 is v2 or more, the preventing unit 230 sets a quality threshold value 3 as the quality threshold value, and a time threshold value 3 as the time threshold value, which are to be used by the switching unit 220 for determining the switching.

Assuming that the wireless LAN communication unit 209 is currently connected to the wireless access point 14a and the communication quality is the RSSI1 with the wireless access point 14a, and the communication quality between the wireless LAN communication unit 209 and the wireless access point 14b is the RSSI2, the switching unit 220 switches, when RSSI2−RSSI1 exceeds the quality threshold value 3, and a period of time in which RSSI2−RSSI1 exceeds the quality threshold value 3 is beyond the time threshold value 3, the wireless access point to be connected from the wireless access point 14a to the wireless access point 14b. Note that, in the embodiment described with reference to FIGS. 3 to 8, the wireless access point to be connected is switched when the relative RSSI (RSSI2−RSSI1) exceeds the quality threshold value, and a period of time in which the relative RSSI exceeds the quality threshold value is beyond the time threshold value. However, an embodiment can be adopted in which, regardless of the period of time in which the relative RSSI exceeds the quality threshold value, the wireless access point to be connected is switched when the relative RSSI exceeds the quality threshold value.

Here, a RSSI threshold value 1>a RSSI threshold value 1a>a RSSI threshold value 1b, a RSSI threshold value 2>a RSSI threshold value 2a>a RSSI threshold value 2b, and a RSSI threshold value 3>a RSSI threshold value 3a>a RSSI threshold value 3b. In addition, a time threshold value 1>a time threshold value 1a>a time threshold value 1b, a time threshold value 2>a time threshold value 2a>a time threshold value 2b, and a time threshold value 3>a time threshold value 3a>a time threshold value 3b. That is, if the vehicle 20 is in the urban area, the switching between the wireless access points 14 may be prevented more often compared to a case in which the vehicle 20 is in the quasi-city area. Also, if the vehicle 20 is in the quasi-city area, the switching between the wireless access points 14 may be prevented more often compared to a case in which the vehicle 20 is in the non-urban area.

Commonly, many wireless access points are placed in the urban area, whereas not so many wireless access points are placed in the non-urban area. Therefore, for example, if the vehicle 20 is in the urban area, frequency of switching between the wireless access points 14 is likely to increase. On the other hand, according to the control by the preventing unit 230, it can be prevented that frequent switching between the wireless access points 14 in the urban area rather causes the communication throughput to be reduced.

The information representing the "urban area", "quasi-city area" and "non-urban area" is one example of an index value for the number of access points being placed. Instead of the information representing the "urban area", "quasi-city area", and "non-urban area", information representing an index value for the number of the access points being placed in each location may be applied.

Figure 4:
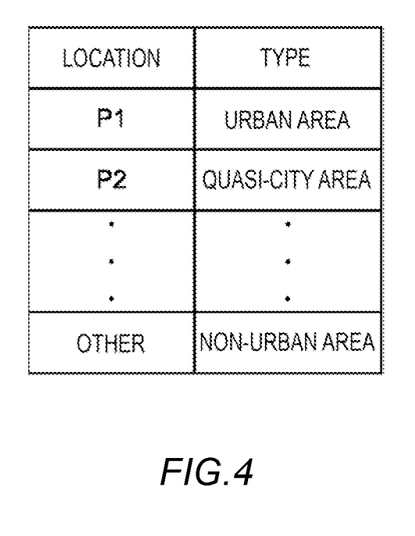
FIG. 4 illustrates one example of data structure for location type information used by the preventing unit 230.

FIG. 4 illustrates one example of data structure for location type information used by the preventing unit 230. The location type information is for associating a location with a type of an area. The location type information is stored in the storage unit 270.

The "location" shows a range of a geographical location. The "type" shows a type of a location. The preventing unit 230 refers to the location type information and identifies the type corresponding to the location that matches the current location of the vehicle 20 obtained by the GNSS receiver 24 as the type of the location in which the vehicle 20 is in. Then, the preventing unit 230 sets the quality threshold value and the time threshold value corresponding to the vehicle 20 by using the threshold information corresponding to the identified type. For example, as described with reference to FIG. 3 etc., the preventing unit 230 sets, if the vehicle 20 is in the urban area, the quality threshold value and the time threshold value corresponding to the vehicle 20 by using the threshold information 300 corresponding to the urban area.

Figure 5:
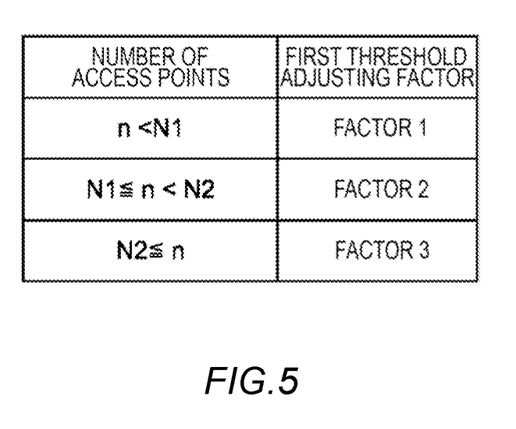
FIG. 5 illustrates one example of data structure for first threshold adjusting value information related to the number of access points.

FIG. 5 illustrates one example of data structure for first threshold adjusting value information related to the number of access points. The first threshold adjusting value information is for associating the number of the wireless access points with a first threshold adjusting factor. The first threshold adjusting value information is stored in the storage unit 270.

The "number of access points" shows a range related to a number n of the wireless access points 14 that has been searched for. Here, N1<N2. The "first threshold adjusting factor" is a factor for adjusting the quality threshold value and the time threshold value. For example, the first threshold adjusting factor is a multiplier factor for the quality threshold value and the time threshold value. Here, a factor 1<a factor 2<a factor 3.

The preventing unit 230 selects, when adjusting the quality threshold value and the time threshold value depending on the number n of the wireless access points 14, the first threshold adjusting factor among the first threshold adjusting value information based on the number n of the wireless access points 14 that has been searched by the searching unit 250. For example, the preventing unit 230 selects, if the number n of the wireless access points 14 that has been searched is N2 or more, a factor 3 as the first threshold adjusting factor for adjusting the quality threshold value and the time threshold value. Then, as described above, the preventing unit 230 sets a value obtained by multiplying the quality threshold value selected from a current location and current speed of the vehicle 20 by the factor 3, as the quality threshold value to be used by the switching unit 220 for determining the switching. Also, as described above, the preventing unit 230 sets a value obtained by multiplying the time threshold value selected from the current location and current speed of the vehicle 20 by the factor 3, as a time threshold value to be used by the switching unit 220 for determining the switching.

If there are many wireless access points 14 in a surrounding area, it is likely that the switching between the wireless access points 14 may occur more often. According to the control by the preventing unit 230, the more there are wireless access points 14 that have been searched for, the less often the switching between the wireless access points 14 can occur. Thereby, if there are many wireless access points 14 in a surrounding area, it can be prevented that frequent switching between the wireless access points 14 rather causes the communication throughput to be reduced.

Note that, FIG. 5 shows an example of a method for adjusting the quality threshold value and the time threshold value by means of the multiplier factor, whereas any method can be applied by which, the more the wireless access points 14 that has been searched for are, the greater the quality threshold value is set, or the more the wireless access points 14 that has been searched for are, the longer the time threshold value is set.

Figure 6:
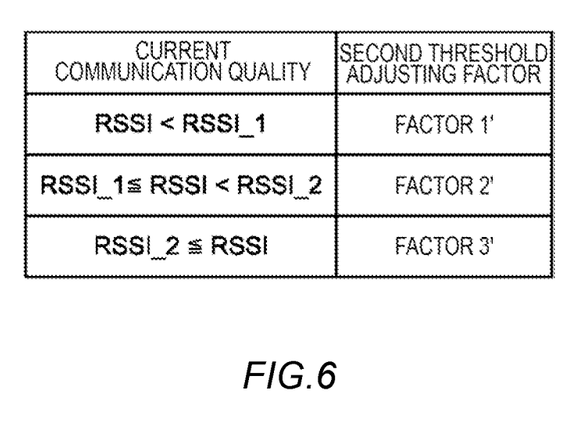
FIG. 6 illustrates one example of data structure for second threshold adjusting value information related to communication quality in current connection.

FIG. 6 illustrates one example of data structure for second threshold adjusting value information related to the communication quality of current connection. The second threshold adjusting value information is for associating current communication quality with a second threshold adjusting factor. The second threshold adjusting value information is stored in the storage unit 270.

The "current communication quality" shows a range related to a RSSI of a signal transmitted from the wireless access point 14 of the current connection. Here, RSSI_1<RSSI_2. The "second threshold adjusting factor" is a factor for adjusting the quality threshold value and the time threshold value. For example, the second threshold adjusting factor is a multiplier factor for the quality threshold value and the time threshold value.

The preventing unit 230 selects, when the quality threshold value and the time threshold value are adjusted depending on the RSSI of the signal transmitted from the wireless access point 14 of the current connection, a second threshold adjusting factor among the second threshold adjusting value information based on the RSSI of the signal transmitted from the wireless access point 14 of the current connection. For example, the preventing unit 230 selects, if a RSSI of a signal transmitted from the wireless access points 14 of current connection is RSSI_2 or more, a factor 3' as the second threshold adjusting factor for adjusting the quality threshold value and the time threshold value. Then, as described above, the preventing unit 230 sets a value obtained by multiplying the quality threshold value selected from a current location and current speed of the vehicle 20 by the factor 3', as the quality threshold value to be used by the switching unit 220 for determining the switching. Also, as described above, the preventing unit 230 sets a value obtained by multiplying the time threshold value selected from the current location and current speed of the vehicle 20 by the factor 3', as a time threshold value to be used by the switching unit 220 for determining the switching.

Here, it may be factor 1'<factor 2'<factor 3'. As a result of this, that the lower a current RSSI is, the lower the quality threshold value and the shorter the time threshold value can be set. Thereby, when the current RSSI is low, the switching between the wireless access points 14 can take place without being prevented too much, and thus switching to the wireless access points 14 having a high RSSI can be facilitated.

Note that, FIG. 6 shows an example of a method for adjusting the quality threshold value and the time threshold value by means of the multiplier factor, whereas any method can be applied by which, the lower the RSSI is, the lower the quality threshold value, or the shorter the time threshold value are set.

Figure 7:
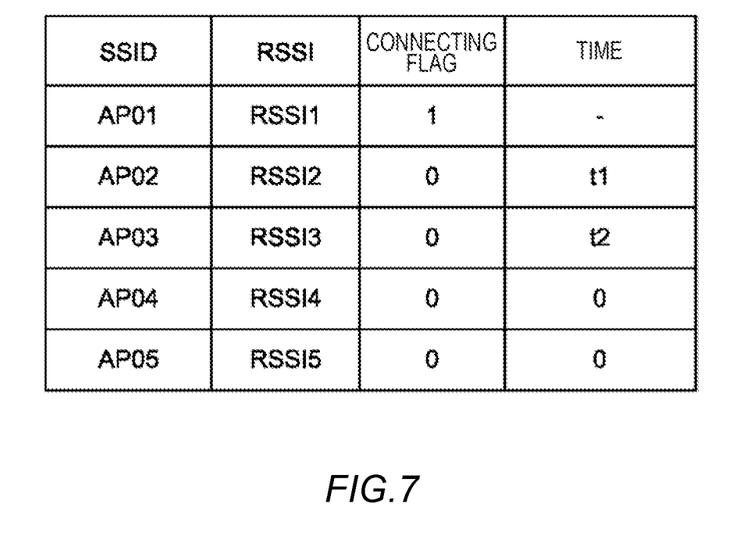
FIG. 7 illustrates one example of data structure for connection information managed by a switching unit 220.

FIG. 7 illustrates one example of data structure for connection information managed by the switching unit 220. The connection information associates a SSID, the RSSI, a connecting flag, and time with one another. The location type information is stored in the storage unit 270.

"SSID" is information for identifying the wireless access point 14. The SSID stands for a Service Set Identifier. The "RSSI" is a current received signal strength indicator of a signal transmitted from each wireless access point 14. The "connecting flag" shows whether the wireless LAN communication unit 209 has been connected to the wireless access point 14. A flag "1" shows that the wireless access point 14 is being connected to. For example, the example of FIG. 7 shows that the wireless LAN communication unit 209 has been connected to the wireless access point 14 having the SSID of "AP01". Note that, being connected to the wireless access point 14 may refer that the wireless LAN communication unit 209 has obtained authentication information through authentication with the wireless access point 14, and thereby the wireless LAN communication unit 209 can transmit or receive data between communication devices external to the wireless access point 14.

The "time" is time at which the RSSI of the signal transmitted from the wireless access point 14 exceeded the RSSI threshold value set by the preventing unit 230. For example, this time is time at which a RSSI below the RSSI threshold value becomes a RSSI over the RSSI threshold value.

Figure 8:
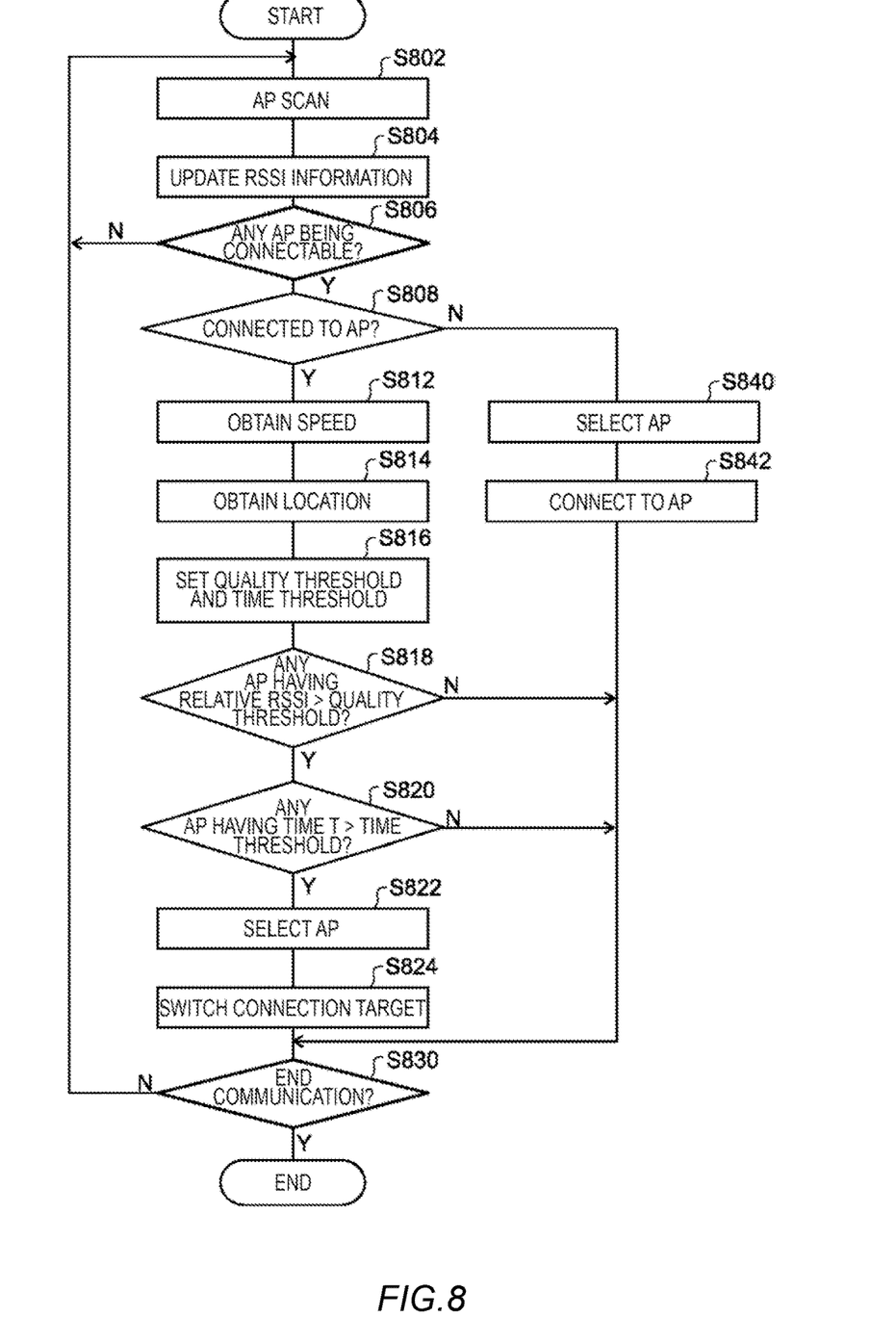
FIG. 8 is a flow chart illustrating execution processes related to information processing method performed by the communication device 100.

FIG. 8 is a flow chart showing an execution process related to an information processing method performed by the communication device 100. Processing in this flowchart starts when the wireless LAN communication unit 209 starts its operation. In S802, the obtaining unit 210 causes the wireless LAN communication unit 209 to execute a scan for searching for the wireless access points 14 in a surrounding area, and obtains wireless access point information containing the SSID and the RSSI of the retrieved wireless access points 14.

In S804, the preventing unit 230 updates, based on the wireless access point information obtained in S802, the "SSID", the "RSSI", and the "time" of the connection information described with reference to FIG. 7 etc. In S806, the switching unit 220 determines, based on the wireless access point information obtained in S802, whether a connectable wireless access point 14 has been searched. For example, the switching unit 220 may determine that, if a wireless access point 14 having a RSSI of a predetermined threshold value or more has been searched, this wireless access point is connectable.

In S808, the wireless LAN communication unit 209 is determined whether it has been connected to the wireless access point 14. If the wireless LAN communication unit 209 has not been connected to the wireless access point 14, the switching unit 220 selects one wireless access point 14 among the wireless access points 14 that has been searched for based on the RSSI (S840), then causes the wireless access point 14 selected in S840 to be connected to the wireless LAN communication unit 209 (S842), and the processing proceeds to S830.

If the wireless LAN communication unit 209 has been connected to the wireless access point 14 in S808, the preventing unit 230 obtains a current speed of the vehicle 20 detected by the speed sensor 22 (S812), and obtains a current location of the vehicle 20 detected by the GNSS receiver 24 (S814). In S816, the preventing unit 230 sets the quality threshold value and the time threshold value. For example, as described with reference to FIG. 3, FIG. 4, etc., the preventing unit 230 refers to the threshold information that matches the current location, and determines the quality threshold value and the time threshold value based on a combination of the current location and the speed. In addition, the preventing unit 230 determines the first threshold adjusting factor based on the number of the wireless access points that has been searched in S802, and the first threshold adjusting value information described with reference to FIG. 5 etc. Furthermore, the preventing unit 230 determines the second threshold adjusting factor based on a RSSI of a signal transmitted from the wireless access point 14 of current connection, and the second threshold adjusting value information described with reference to FIG. 6 etc. The preventing unit 230 sets the quality threshold value to be used by the switching unit 220 for determining the switching, by multiplying the quality threshold value determined based on the combination of the current location and the speed by the first threshold adjusting value information and the second threshold adjusting value information. Also, the preventing unit 230 sets the time threshold value to be used by the switching unit 220 for determining the switching, by multiplying the time threshold value determined based on the combination of the current location and the speed by the first threshold adjusting factor and the second threshold adjusting factor.

In S818, the switching unit 220 refers to the connection information and determines, among one or more wireless access points 14 being connectable, whether there is a wireless access point 14 having a relative RSSI for the RSSI of the wireless access point 14 in current connection, which exceeds the quality threshold value set in S816. If there is no wireless access point 14 having a relative RSSI that exceeds the quality threshold value, the processing proceeds to S830. If there is a wireless access point 14 having a relative RSSI that exceeds the quality threshold value, then in S820, the switching unit 220 refers to the connection information and determines whether there is the wireless access point 14 of which relative RSSI exceeds the quality threshold value for a period of time beyond the time threshold value set in S816. If there is no wireless access point 14 of which relative RSSI exceeds the quality threshold value for a period of time beyond the time threshold value, the processing proceeds to S830. If there is a wireless access point 14 of which relative RSSI exceeds the quality threshold value for a period of time beyond the time threshold value, the processing proceeds to S822.

In S822, the switching unit 220 selects, among the wireless access points 14 of which relative RSSI exceeds the quality threshold value for a period of time beyond the time threshold value, one wireless access point 14 as a target to which the connection is switched. Here, the switching unit 220 refers to the connection information, and gives priority to a wireless access point 14 having a higher RSSI and selects this wireless access point 14 as the target to which the connection is switched. In S824, the switching unit 220 switches the connection target of the wireless LAN communication unit 209 to the wireless access point 14 selected in S822. Then, in S830, the information processing device 208 determines whether to end the wireless LAN communication. For example, when an ignition source of the vehicle 20 is turned off, the wireless LAN communication is determined to be ended. If the wireless LAN communication is not to end, the processing proceeds to S802, and if the wireless LAN communication is to end, the processing in this flowchart also ends.

In the above description, the preventing unit 230 is for executing the processing for preventing the switching between the wireless access points 14 based on the speed of the vehicle 20, and (1) the current location of the vehicle 20, (2) time at which the relative RSSI exceeds the time threshold value, (3) the number of the wireless access points that has been searched for, and (4) the RSSI for the wireless access point 14 in current connection. However, the preventing unit 230 may execute the processing for preventing the switching between the wireless access points 14 based on the speed of the vehicle 20, and information from any combination of (1), (2), (3), and (4). The preventing unit 230 may execute the processing for preventing the switching between the wireless access points 14 based only on the speed of the vehicle 20.

The RSSI is used here as an indicator for showing the communication quality, whereas another indicator may also be used as long as the indicator shows the communication quality. For example, a received signal strength indicator may be calculated based on an output bit of an analog-to-digital converter (ADC) for converting a reception signal received by an antenna included in the wireless LAN communication unit 209 into a digital signal, and/or an amplification factor for a reception signal in an amplifier included in a transmission/reception circuit in the wireless LAN communication unit 209. Alternatively, any of a voltage value, a current value, and a power value may be used as a received signal strength indicator, which may be obtained from a measurement circuit for measuring power received being arranged in the transmission/reception circuit.

Note that, in the present embodiment, switching between the wireless access points 14 in the wireless LAN communication has been described, whereas this description may also be applied to switching between access points in a wireless communication system apart from the wireless LAN communication.

As described above, according to the control by the communication device 100, the faster the speed of the vehicle 20 is, the less often the switching between the wireless access points 14 can occur. Therefore, the communication throughput can be prevented from being reduced by frequently switching between the wireless access points 14. Such control is advantageous in controlling in an urban area where there are many wireless access points 14, for example.

Figure 9:
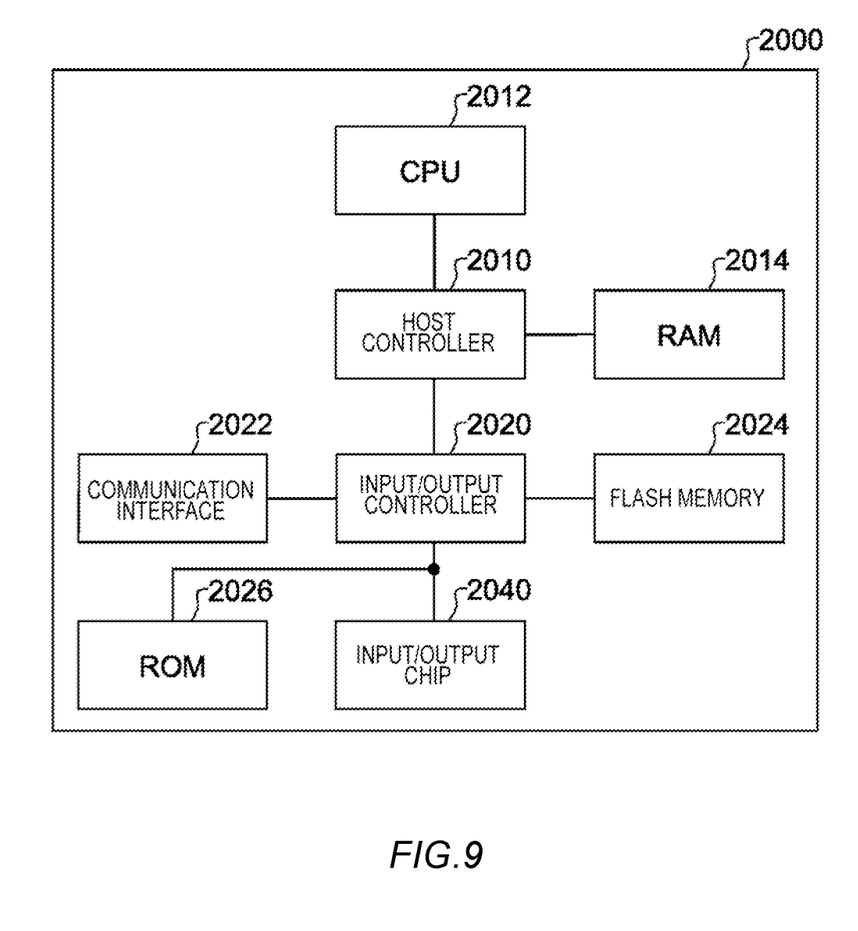
FIG. 9 illustrates an example of a computer 2000.

FIG. 9 illustrates an example of a computer 2000 in which a plurality of embodiments in the present invention may be entirely or partially embodied. A program installed in the computer 2000 can cause the computer 2000 to function as a device such as the information processing device according to the embodiments or each unit in this device, to perform operations associated with the each unit, and/or to perform processes according to the embodiments or steps of these processes. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input and output chip 2040. The ROM 2026, the flash memory 2024, the communication interface 2022, and the input and output chip 2040 are connected to the host controller 2010 via an input and output controller 2020.

The CPU 2012 operates according to programs stored in the ROM 2026 and the RAM 2014, thereby controlling each unit.

The communication interface 2022 communicates with other electronic devices via a network. The flash memory 2024 stores a program and data used by the CPU 2012 in the computer 2000. The ROM 2026 stores a boot program or the like executed by the computer 2000 during activation, and/or a program depending on hardware of the computer 2000. The input and output chip 2040 may also connect to various input and output units such as a keyboard, a mouse, and a monitor, to the input and output controller 2020 via input and output ports such as a serial port, a parallel port, a keyboard port, a mouse port, a monitor port, a USB port, a HDMI (registered trademark) port.

The program is provided via a network or a computer readable storage medium such as a CD-ROM, a DVD-ROM, or a memory card. The RAM 2014, the ROM 2026, or the flash memory 2024 is an example of the computer readable storage medium. The program is installed in the flash memory 2024, the RAM 2014 or the ROM 2026 and executed by the CPU 2012. Information processing written in these programs is read by the computer 2000, and provides cooperation between the programs and the various types of hardware resources described above. A device or a method may be configured by implementing operations or processing of information according to a use of the computer 2000.

For example, when communication is performed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014, and perform various types of processing on the data on the RAM 2014. Next, the CPU 2012 writes back the processed data into the recording medium.

Various types of information such as various types of programs, data, a table, and a database may be stored in the recording medium and may be subjected to information processing. The CPU 2012 may execute, on the data read from the RAM 2014, various types of processing including various types of operations, information processing, conditional judgement, conditional branching, unconditional branching, information retrieval and replacement, or the like described in herein and specified by instruction sequences of the programs, and write back a result into the RAM 2014. In addition, the CPU 2012 may search for information in a file, a database, or the like in the recording medium. For example, when a plurality of entries, each having an attribute value of a first attribute associated with an attribute value of a second attribute, is stored in the recording medium, the CPU 2012 may search for an entry having a designated attribute value of the first attribute that matches a condition from the plurality of entries, and read the attribute value of the second attribute stored in the entry, thereby obtaining the attribute value of the second attribute associated with the first attribute that satisfies a predetermined condition.

The programs or a software module described above may be stored on the computer 2000 or in a computer readable storage medium near the computer 2000. A recording medium provided in a server system connected to a dedicated communication network or the Internet, such as a hard disk or RAM, can be used as the computer readable storage medium. The programs stored in the computer readable storage medium may be provided to the computer 2000 via the network.

A program installed in the computer 2000 in order to cause the computer 2000 to function as the information processing device 208 may act on the CPU 2012 and the like so that the computer 2000 functions as each unit of the information processing device 208. Upon being read by the computer 2000, the information processing written in these programs functions as a concrete mean being each unit of the information processing device 208 provided through cooperation of software and each type of hardware resources mentioned above. By means of these concrete means, information is calculated or processed to suit a purpose of use of the computer 2000 in the present embodiment, thereby a distinctive information processing device 208 to suit the purpose of use is constructed.

Various embodiments have been described with reference to the block diagrams and the like. In the block diagrams, each block may represent (1) a step of a process in which an operation is executed, or (2) each unit of the device having a role in executing the operation. Specific steps and each unit may be implemented by a dedicated circuit, a programmable circuit supplied along with a computer readable instruction stored on a computer readable storage medium, and/or a processor supplied along with the computer readable instruction stored on the computer readable storage medium. The dedicated circuit may include a digital and/or analog hardware circuit, or an integrated circuit (IC) and/or a discrete circuit. The programmable circuit may include a reconfigurable hardware circuit including logical AND, logical OR, logical XOR, logical NAND, logical NOR, and other logical operations, and a memory element such as a flip-flop, a register, a field programmable gate array (FPGA), a programmable logic array (PLA), or the like.

The computer readable storage medium may include any tangible device capable of storing an instruction to be executed by an appropriate device, so that the computer readable storage medium having the instruction stored thereon constitutes at least a part of a product including an instruction that may be executed in order to provide means to execute an operation specified by a processing procedure or a block diagram. Examples of the computer readable storage medium may include an electronic storage medium, a magnetic storage medium, an optical storage medium, an electromagnetic storage medium, a semiconductor storage medium, and the like. More specific examples of the computer readable storage medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, and the like.

The computer readable instruction may include either a source code or an object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

The computer readable instruction may be provided to a processor of a general purpose computer, a special purpose computer, or other programmable data processing device, or to programmable circuit, locally or via a local area network (LAN), wide area network (WAN) such as the Internet, and a computer readable instruction may be executed to provide means for performing operations specified in the described processing procedures or block diagrams. Examples of processors include computer processors, processing units, microprocessors, digital signal processors, controllers, microcontrollers, and the like.

While the embodiments of the present invention have been described, the technical scope of the present invention is not limited to the above described embodiments. It is apparent to persons skilled in the art that various alterations and improvements can be added to the above described embodiments. It is also apparent from the scope of the claims that the embodiments added with such alterations or improvements can be included in the technical scope of the present invention.

The operations, procedures, steps, stages, etc. of each process performed by a device, system, program, and method shown in the claims, specification, or drawings can be performed in any order as long as the order is not clearly indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES

12: base station; 14: wireless access point; 20: vehicle; 201: mobile object communication unit; 208: information processing device; 210: obtaining unit; 220: switching unit; 230: preventing unit; 250: searching unit; 270: storage unit; 300: threshold information; 2000: computer; 2010: host controller; 2012: CPU; 2014: RAM; 2020: input and output controller; 2022: communication interface; 2024: flash memory; 2026: ROM; 2040: input and output chip

What is claimed is:

1. An information processing device provided in a mobile object, comprising a processor for:
    obtaining, while a communication unit connects to a first access point and executes wireless communication through the first access point, information representing a first communication quality being communication quality for wireless communication between the communication unit and the first access point, and information representing a second communication quality being communication quality for wireless communication between the communication unit and a second access point,
    switching, if a difference between the second communication quality and the first communication quality is greater than a predetermined quality reference value, a connection target of the communication unit from the first access point to the second access point, and
    preventing, such that the faster a moving speed of the mobile object is, the less often switching of the connection target occurs, wherein
    the faster the moving speed of the mobile object is, the greater the processor is configured to set the quality reference value.

2. The information processing device according to claim 1, wherein the processor is configured to set the quality reference value based further on a current location of the mobile object.

3. The information processing device according to claim 1, wherein the processor is configured to search for access points being connectable by the communication unit, and set the quality reference value such that the more access points that has been searched for are, the greater the quality reference value is.

4. The information processing device according to claim 1, wherein the lower the first communication quality is, the lower the processor is configured to set the quality reference value.

5. The information processing device according to claim 1, wherein the processor is for:
    switching, if a difference between the second communication quality and the first communication quality remains being greater than a predetermined quality threshold value for a period of time beyond a predetermined time threshold value, a connection target of the communication unit from the first access point to the second access point; and
    setting the time threshold value such that the faster a moving speed of the mobile object is, the longer the time threshold value is.

6. The information processing device according to claim 5, wherein the processor is configured to set the time threshold value based further on a current location of the mobile object.

7. The information processing device according to claim 6, comprising:
    a storage unit for associating information representing a geographical location with an index value representing a number of access points being connectable, and storing this associated information, wherein
    the greater the index value, which is associated with a geographical location that matches a current location of the mobile object and stored in the storage unit is, the longer the processor is configured to set the time threshold value.

8. The information processing device according to claim 5, wherein
    the processor is configured to search for access points being connectable by the communication unit, and
    the more access points that has been searched for are, the longer the processor is configured to set the time threshold value.

9. The information processing device according to claim 5, wherein the lower the first communication quality is, the shorter the processor is configured to set the time threshold value.

10. The information processing device according to claim 5, wherein the communication quality is a RSSI (receiving signal strength indicator).

11. The information processing device according to claim 1, wherein the mobile object is a vehicle.

12. A mobile object, comprising:
    the information processing device according to claim 1.

13. An information processing device provided in a mobile object, comprising a processor for:
    obtaining, while a communication unit connects to a first access point and executes wireless communication through the first access point, information representing a first communication quality being communication quality for wireless communication between the communication unit and the first access point, and information representing a second communication quality being communication quality for wireless communication between the communication unit and a second access point,
    switching, if a difference between the second communication quality and the first communication quality is greater than a predetermined quality reference value, a connection target of the communication unit from the first access point to the second access point, and
    preventing, such that the faster a moving speed of the mobile object is, the less often switching of the connection target occurs, wherein the processor is configured to set the quality reference value based further on a current location of the mobile object, and the information processing device comprises a storage unit for associating information representing a geographical location with an index value for a number of access points being placed, and storing this associated information, wherein the greater the index value, which is associated with a geographical location that matches a current location of the mobile object and stored in the storage unit is, the greater the processor is configured to set the quality reference value.

14. An information processing method performed in a mobile object, comprising:

obtaining, while a communication unit connects to a first access point and executes wireless communication through the first access point, information representing a first communication quality being communication quality for wireless communication between the communication unit and the first access point, and information representing a second communication quality being communication quality for wireless communication between the communication unit and a second access point;

switching, if a difference between the second communication quality and the first communication quality is greater than a predetermined quality reference value, a connection target of the communication unit from the first access point to the second access point; and preventing, such that the faster a moving speed of the mobile object is, the less often switching of the connection target occurs, wherein the faster the moving speed of the mobile object is, the greater the quality reference value is set.

15. A non-transitory computer readable storage medium stored thereon a program that causes a computer mounted on a mobile object to perform operations comprising:

obtaining, while a communication unit connects to a first access point and executes wireless communication through the first access point, information representing a first communication quality being communication quality for wireless communication between the communication unit and the first access point, and information representing a second communication quality being communication quality for wireless communication between the communication unit and a second access point;

switching, if a difference between the second communication quality and the first communication quality is greater than a predetermined quality reference value, a connection target of the communication unit from the first access point to the second access point; and preventing, such that the faster a moving speed of the mobile object is, the less often switching of the connection target occurs, wherein the faster the moving speed of the mobile object is, the greater the quality reference value is set.

* * * * *